March 7, 1967 — E. H. LAND — 3,307,460
SEMIAUTOMATIC CAMERA INSTRUMENTATION
Filed Nov. 3, 1965 — 2 Sheets-Sheet 1

INVENTOR.
EDWIN H. LAND
BY
BROWN and MIKULKA
and
WILLIAM D. ROBERSON
*ATTORNEYS*

INVENTOR.
EDWIN H. LAND
BY
BROWN and MIKULKA
and
WILLIAM D. ROBERSON
*ATTORNEYS*

United States Patent Office 3,307,460
Patented Mar. 7, 1967

3,307,460
SEMIAUTOMATIC CAMERA INSTRUMENTATION
Edwin H. Land, Cambridge, Mass., assignor to Polaroid Corporation, Cambridge, Mass., a corporation of Delaware
Filed Nov. 3, 1965, Ser. No. 506,170
9 Claims. (Cl. 95—10)

This application is a continuation-in-part of a prior copending application, Serial No. 359,114 filed April 13, 1964.

This invention relates to camera systems and, more particularly, to cameras provided with semiautomatic controls for determining and indicating to the operator the attainment of correct exposure settings under a variety of conditions.

The wide variety of conditions under which photographs are taken places major demands of versatility upon any well-made camera. It is not uncommon, for example, for a camera to be required to provide adequate photographic records under lighting conditions over a range of brightnesses varying by as much as one to sixteen thousand and even greater. In a typical photographic situation the demands upon the operator's attention can be complex. In addition to composing and framing the subject, the operator is often required to make adjustments in focus, in shutter speed, and in lens aperture and to assure himself that these adjustments are correct up to the instant the exposure is made.

To ease the burdens on the attention of the photographer many complex and marvelous automatic and semiautomatic instrumentation systems have been proposed and have found their way into use in recent times.

Completely automatic instrumentation systems have been provided which respond automatically to a condition of the picture-taking situation, such as the brightness of the field of view, for example, to set the aperture or shutter speed. Such automatic systems tend to place the least burdens on the photographer. As might be expected, however, they represent comparatively expensive approaches to the problems of photographic instrumentation.

Semiautomatic camera controls, although generally less expensive, require more of the photographer's attention. Therefore, they tend to distract him in the task of capturing the image. For example, a camera incorporating a photometer linked to the exposure controls of the camera typically requires the user to direct his attention away from the field of view while obtaining the correct exposure settings. Some attempts have been made to minimize this distraction by optically introducing a portion of the instrument indicator into a portion of the viewfinder to reduce the amount by which the operator must shift his attention to assure himself of the correctness of the exposure settings. A shift of attention is nevertheless necessary, and this represents, to a greater or lesser degree, a distraction which may prevent the photographer from obtaining an optimum image. In addition, the complexity of such indicator systems adds significantly to the cost of the total system.

It is an object of this invention to provide an improved and simplified semiautomatic camera instrumentation combination which provides a positive indication to the operator that a correct setting has been obtained without requiring the operator to direct his attention away from the image situation before him.

A further object of the invention is to provide novel photographic instrumentation which automatically signals the selection of a correct exposure factor by nonvisual means.

A still further object of the invention is the provision of a camera having adjustable exposure settings and incorporating an improved photometric system for signaling, by a positive vibration transmitted to the user, when a correct exposure setting has been selected.

By way of a brief summary of one embodiment of the invention, a camera is provided incorporating, in this example, a fixed-speed shutter and adjustable diaphragm means for regulating the size of the exposure aperture. Also incorporated into the camera is a measuring circuit including a light-sensitive photoconductor exposed to scene light. A manually adjustable control knob which regulates the size of the exposure aperture also controls diaphragm means over the photoconductor to vary the amount of scene light permitted to fall on the photoconductor, both diaphragm means being adjusted proportionately by the control knob. The measuring circuit senses the conductivity of the photoconductor and responds, when the diaphragm means are set properly, by energizing a vibratable transducer associated with the control knob. When the correct exposure setting has been selected, the transducer is energized and transmits to the control knob a vibration which the user perceives, preferably by the tactile sense. The control knob preferably has associated with it a normally open switch which, closed by the force exerted on it during manipulation, completes the energization of the measurement circuit. During the selection of the correct exposure factor, the entire visual attention of the operator may thus be focused on the image situation before him. The control knob is also axially movable to trip the shutter. The operator needs only to turn the knob until he senses the vibration and then to push the knob to effect the exposure without once shifting his sight from the scene being photographed.

Although an illustrative embodiment has thus been briefly described, the scope of the invention in its broader aspects is not to be limited except by the claims appended hereto. Further details of the invention as well as additional objects and advantages will be more apparent from the following detailed description of a preferred embodiment taken together with the accompanying drawings wherein:

Figures 1, 2:
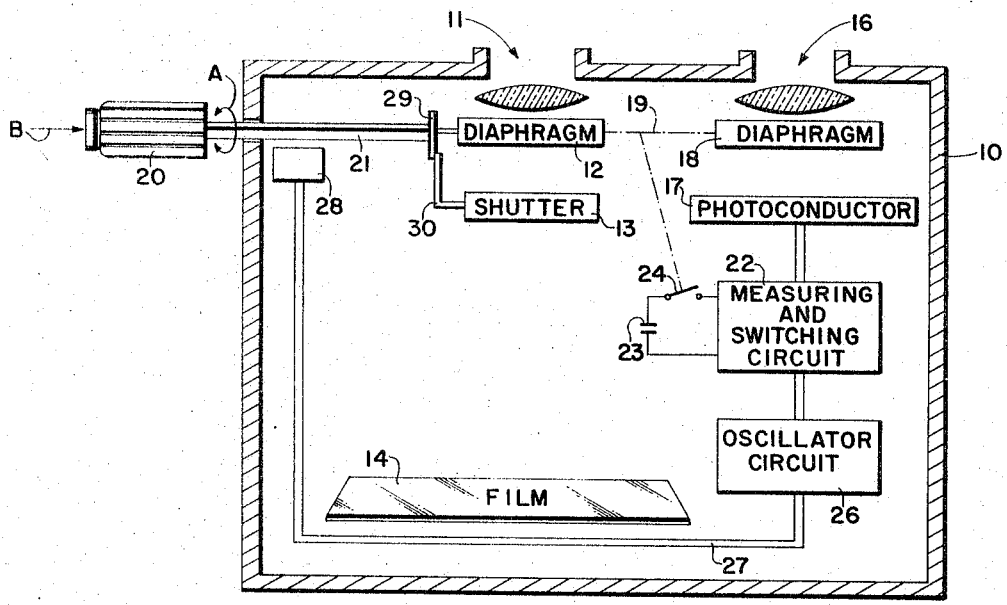
FIGURE 1 is a diagrammatic illustration of the major components of a camera system constructed in accordance with this invention.
FIG. 2 is a rear view of the front housing of the camera showing the diaphragm means by which the exposure and photometer apertures can be changed synchronously.

Referring now to FIGURE 1, a photographic camera system is shown diagrammatically therein to comprise a casing 10 having an exposure aperture 11 with an adjustable diaphragm means 12 and a fixed speed shutter 13, aligned therewith for the exposure of a photosensitive surface, represented by film 14, to light from a scene to be photographed. The camera also includes a photometer aperture 16 for admitting light from the same scene to a photoconductive cell 17 through another diaphragm means 18, the latter being coupled mechanically by means represented diagrammatically at 19 to the first-mentioned diaphragm means 12. The operator, viewing the scene, operates control member 20 in a rotary direction represented by arrow A. As will be described in detail below, this rotates control shaft 21 and causes the diaphragm means of both the exposure aperture and the photometer aperture to decrease or increase by similar ratios until the correct exposure setting is selected.

In the adjustment of the diaphragm means 12 and 18 the conductivity of the photoconductor 17 varies in dependence upon the intensity of light incident thereon from the scene. This variable parameter is sensed by the measuring and switching circuit 22 powered from a potential source 23 through switch 24. Switch 24, about which more will be said below, is shown normally open, but for purposes of the present discussion may be assumed to be closed.

For a given brightness level of the scene at which the camera system shown in FIGURE 1 is directed, there is essentially one correct exposure factor represented in this example by the exposure aperture area. Other elements influence the exposure factor, of course, such as the sensitivity of film 14, the speed of shutter 13 and the percent transmission of the optical elements in the exposure aperture. Since such other factors in the illustrated example are essentially constant, each aperture area presented by diaphragm means 12 can be understood as representing a different exposure factor.

The correct exposure factor then is that setting of diaphragm 12 which admits sufficient image light through the exposure aperture to provide an adequate photographic exposure of the film 14. At the correct exposure factor the conductivity of photoconductor 17 is selected to be of a particular predetermined value. When adjustment of the diaphragm means 12 and 18 results in the conductivity of the photocell being equal or approximately equal to this value, the measuring and switching circuit energizes an oscillator circuit represented at 26 to deliver a vibrator signal over conductors 27 to a transducer represented at 28 adjacent control shaft 21. The transducer induces a vibration in control shaft 21 and control member 20. A vibration is thus transmitted to and through the same instrumentality which the operator manipulates to control the exposure aperture, signalling that the correct exposure factor has been selected. The frequency of the vibration is preferably selected from a ange of frequencies to which the maximum tactile response occurs, generally in the low sonic to subsonic range.

Once the correct exposure setting has thus been signalled, the operator can with confidence effect the exposure by actuating the shutter 13. For this purpose the control member 20 is mounted to permit axial movement in the direction indicated by arrow B. Abutment means represented by flange 29 mounted to move with the control shaft 21 in its axial movement bears against a trip lever 30 to actuate the shutter 13 as the control member is moved axially inward.

The control knob 20 in this embodiment performs multiple functions. First, it controls the area of the exposure aperture and, hence, governs the selection of a range of exposure factors. Second, by varying the photometer aperture it adjusts the conductive parameter of the photoconductive element to which the measuring and control circuit responds. Third, it transmits a positive indication that the correct exposure factor has been selected when, as a result of the energization of the transducer, it is caused to vibrate in the fingers of the user. In addition, it functions to trip the shutter and effect exposure of the photosensitive material in the camera. As will be seen in the further description below, it may also be used to prevent unnecessary drain on the battery or other source of power for the measuring circuit by permitting energization of the circuit only while photometric selection of the correct exposure factor is actually being effected.

Figure 3:
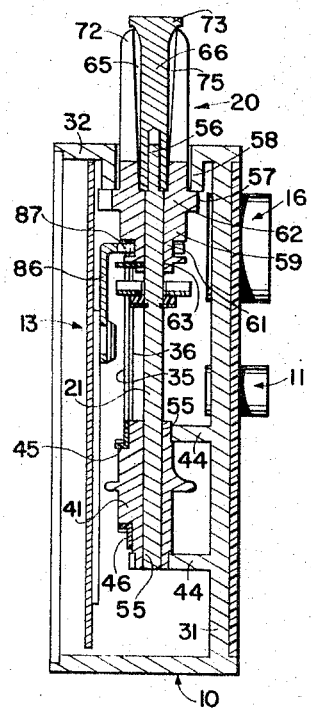
FIG. 3 is a sectional view taken along the line 3—3 of FIG. 2 and showing details of the control means by which the diaphragm means may be adjusted and the shutter tripped, the camera shutter being shown in place for convenience in describing the operation of the invention.

Turning now to further details in the execution of the invention, as shown in FIGS. 2 and 3, diaphragm means 12 and fixed speed shutter 13 are both mounted on housing 10 which defines the front portion of the camera. Accordingly, housing 10 may include an essentially flat plate 31 containing photometer aperture 16 and exposure aperture 11, and a peripheral flange 32 extending normal to the plate 31 to define a recessed volume within which the diaphragm and shutter are contained. Diaphragm means 12 includes a pair of blades 35 and 36 pivotally mounted together at bearing 37 on boss 38 that is integral with housing 10. The diaphragm blades are positionable at various relative angular positions by operation of control means which includes control shaft 21 and knob 20. Control shaft 21 carries a cam 41 providing means for causing blades 35 and 36 to have various relative angular positions at which the edges of the blades overlie each other and are contoured to define variable photometer aperture 42 and variable exposure aperture 43 respectively aligned with apertures 16 and 11 in plate 31. As shown in the drawing, the axes of apertures 16 and 11 and the axis of bearing 37 lie in a common plane. Cam 41 may take the form of a cylindrical member having complementary wedgelike surfaces 45 and 46 each inclined in a more or less helical arrangement around the axis 47 of the cam. The axial ends of the cam member 41 are reduced in diameter to be rotatably mounted in spaced fixed bearing supports 44 integrally formed on housing 10. Each of blades 35 and 36 has an extension 48 and 49 respectively, projecting therefrom adjacent the region defining pivot 37 and terminating in free ends that lie adjacent to opposite surfaces 45 and 46 of the cam with followers 62 operatively engaging those surfaces. The cam followers are urged into engagement with the cam surfaces by a wire spring 51 wrapped around bearing 37 and pressing at its opposite ends against projections 52 and 53 on the respective diaphragm blades. As a consequence of this construction, rotation of cam 41 serves to impart simultaneous but oppositely directed pivotal movement to blades 35 and 36. Thus, the effective areas of photometer aperture 16 and exposure aperture 11 are either increased or decreased simultaneously, the aperture being indicated by indicia associated with adjacent portions 50 of the blades.

The control shaft 21 in this embodiment is square and is longitudinally slidable in a square aperture 55 (see FIG. 3) in cam 41, extending upwardly from the cam and terminating in an end portion 56 projecting into control knob 20 normal to flange 32 at the top of housing 10. As shown best in FIG. 3, the control knob 20 has a base which has a cylindrical bearing portion 57 rotatably mounted in boss 58 that is integral with flange 32 and extends inwardly therefrom, and a cylindrical portion 59 that extends from the base toward cam 41 including an annularly recessed shutter actuating portion 61. The cylindrical bearing portion 57, when engaging boss 58, constitutes stop means for limiting axial displacement of the knob in the upward direction. The base 62 of the knob is provided with square axial aperture 63 within which shaft 21 is axially slidable. Aperture 63 opens into an enlarged circular recess 65 in the free end of knob 20 that faces toward the exterior of the housing.

Figure 4:
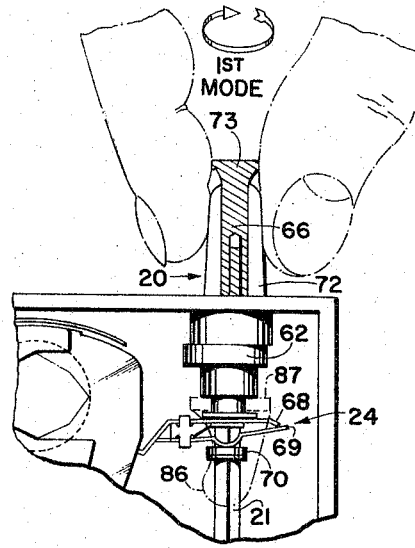
FIG. 4 is an enlarged view of the control means as shown in FIG. 2 except that the various parts are shown in section for illustrating the first mode of operation of the control means.

The upper end 56 of shaft 21 carries a circular rod 66, which is of a diameter greater than the diagonal dimension of shaft 21, rigidly attached thereto to define a shoulder against which portion 62 of the knob is engageable. As seen in FIG. 4, spring contact arm 68 is engaged by the lower portion of the knob 20 and serves to bias the latter upward. Contact arm 69, on the other hand, bears against an insulated washer 70 carried by shaft 21 urging it downward. This serves to resiliently maintain the knob 20 and the shaft 21 in the relative positions shown in FIG. 3.

Portion 72 of the knob 20 is provided with a plurality of individual axially extending cantilevered segments that surround rod 66. Preferably, the segments are formed by properly slotting a cylindrical extension to the base portion 62, the outer surface of which defines coaxial surfaces adapted to be grasped between the fingers of the user as indicated in FIG. 4. An enlarged conical portion 73 at the free end of the rod 66 on shaft 21 is engaged by the free ends of the cantilevered segments when the knob is in the normal position shown in FIG. 3. Rod 66 is of such cross section relative to these segments as to define therebetween an annular region 75 within which radial deflection of the segments can be accommodated.

With the above-described construction, it is apparent that shaft 21 is mounted on the housing for both rotation and axial reciprocation, and that the knob 20 is keyed to the shaft 21 but is axially slidable thereon for axial movement relative to the housing as well as rotation thereon. Since the shaft is keyed to cam 41, the rotation of which is necessary to cause relative pivotal movement of blades 35 and 36 in opposite directions, it follows that the mass of the various parts as well as the friction therebetween, require the user to impart to knob 20 a predetermined amount of torque in order to rotate cam 41 and change the sizes of openings 42 and 43. Such torque is developed partially as the result of inwardly directed radial forces applied to opposite surfaces of the knob when the user grasps the knob with his fingers as shown in FIG. 4 and tries to rotate the knob. The inwardly directed radial forces on the surface of knob 20 accompanied by rotation of the fingers generate tangentially to this surface a pair of oppositely directed couple forces, the magnitudes of which are dependent upon the coefficient of friction between the knob and the fingers and the amount of radial force exerted on the knob by the user. Thus, on the average, there will be some minimum radial force which must be applied to the knob in order to overcome the resistance of the movable parts (the blades, cam, etc.) of the diaphragm means and effect a change in the aperture areas defined by the two diaphragm blades. If the cantilevered segmented portions 72 are elastic enough to deflect radially under the minimum radial load, as shown in FIG. 4, a relative axial movement will result between knob 20 and shaft 21 due to the camming action of the free ends of the slotted knob portion 72 on the inverted conical portion 73 of the shaft drawing the shaft upward within the grasped portion of the control knob 20 as shown in FIG. 4.

When this is done, the spring contacts 68 and 69 of switch 24 are drawn together, closing the switch and energizing the measuring and control circuit 22 (represented in FIGURE 1). As best seen in FIG. 2, the contact arms 68 and 69 of switch 24 are carried on movable ends of lengthy flexible conductors 76 and 77. The opposite ends of these conductors are supported in stationary positions on an integral molded extension 78 of the housing for connection to the battery 23 and the measuring circuit 22 (not shown in FIG. 2).

As previously indicated, the measuring and switching circuit 22 may respond to the selection of the correct exposure factor by triggering the oscillator circuit 26 to energize the transducer 28. Many types of vibration-inducing transducers may be employed in the practice of this invention, including triggered spring wound buzzers, interrupted-contact vibrators energized by direct current, and rotary motors with eccentric vibratory flywheels. To illustrate the principles of the invention, however, in the embodiment selected for description the transducer 28 is shown to include a stationary U-shaped magnetic core 80 having an electrical winding 81 about one leg of the core. It is this winding 81 which is energized by the oscillator circuit. Between the free ends of core 80 and the control shaft 21 is positioned a hammer or clapper 82 of magnetic iron mounted on a cantilevered spring 83 having its opposite end 84 fixed with respect to the housing. When the oscillator delivers a signal of suitable frequency to the winding 81 of the transducer, the clapper 82 vibrates back and forth tapping out its rhythm on the control shaft 21 in frequencies perceptible to the tactile sense. This vibratory signal is transmitted through the shaft 21 to the control knob 20, signalling to the operator the selection of the correct exposure factor.

This vibratory signal, it is carefully to be noted, registers on the operator through nonvisual sensory channels. Not once in the selection of the correct exposure factor is it necessary for the operator to distract his attention from the image situation before him. Although the obtaining of a desired photographic record is an activity guided by visual faculties, the photographer has a wide range of useful sensory functions at his disposal. This invention makes it possible to make use of a greater range of available functions and to direct his visual attention where it is needed most in the task of creating or capturing the image.

Returning to additional functions of the control knob, it will be appreciated that the resilient nature of the cantilevered segmented portions 72 of knob 20 are such that, upon release, they spring back to their normal position. Spring contact arms 68 and 69 are effective to return the knob 20 to its normal position relative to shaft 21. This serves to disconnect the battery from the measuring circuit 22.

Figure 5:
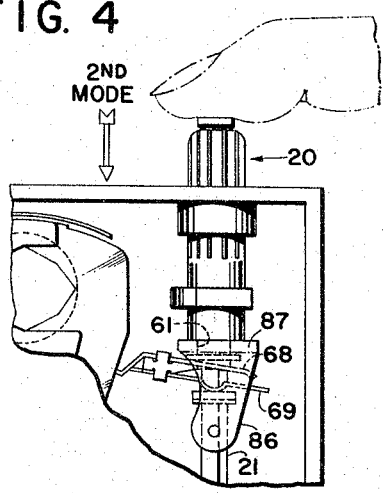
FIG. 5 is similar to FIG. 4 except that a second mode of operation of the control means is shown.

A suitable material for knob 20 having the requisite degree of resilience and ease of deformation is nylon, although other materials suitable for this purpose will be suggested to those skilled in the art once the operation of the disclosed device is appreciated. Since the tapered end 73 on shaft 21 extends axially beyond knob 20, it provides access for applying an axial force to the knob that is independent of the torque developed to effect photometric balance. In other words, the control means which includes knob 20 has another mode of operation. In another mode knob 20 performs the function of a shutter actuator. Since shutter structures per se are not the subject of this invention, this disclosure will not be unduly burdened with shutter details. As to these reference may be had to the aforesaid parent patent application of which the present application is a continuation-in-part. It should be sufficient to note that when, as shown in FIG. 5, the control knob 20 is depressed axially, it carries with it an actuating member 86 having a bifurcated yoke portion 87 engaging the annular recessed portion 61 of the knob. The actuating member in this example is a portion of a fixed-speed shutter mechanism 13 as seen in FIG. 3. Depression of actuating member 86 causes shutter mechanism 13 first to initiate and then to terminate exposure through the exposure aperture after an interval of fixed duration.

It is to be noted that depression of knob 20 to actuate the shutter causes knob 20 and shaft 21 to travel together without relative displacement therebetween. Consequently, the contacts 68 and 69 of switch 24 are not closed and the measurement circuit, the oscillator circuit and the transducer remain unenergized while the exposure is being made. This construction makes optimum use of the battery 23 because current is drawn from the latter only during the time required by the user to obtain photometric selection of the correct exposure factor. It also results in cessation of the vibrations produced in the camera by the transducer while the exposure is being made.

Figure 6:
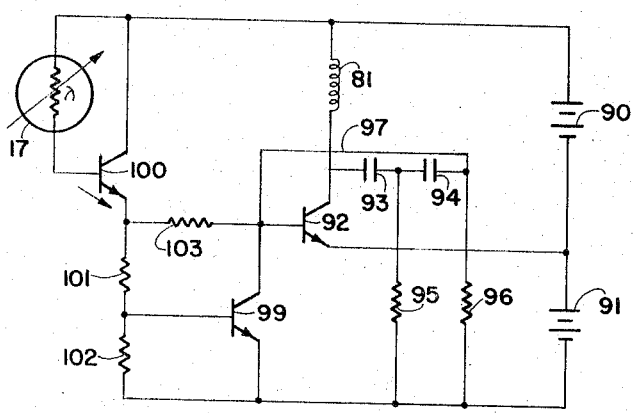
FIG. 6 is a schematic diagram of a combined photometric measuring, switching and oscillator circuit of a type which may be employed in the practice of this invention.

In FIG. 6 is shown one type of circuit useful in the practice of this invention to trigger the vibration-inducing transducer. This illustrative circuit combines the functions of the measuring and switching circuit 22 and of the oscillator circuit 26. Here the oscillator circuit, powered from a direct current source represented by batteries 90 and 91, includes transistor 92 connected with capacitors 93 and 94, resistors 95 and 96, and the winding 81 of the transducer 28 as a phase shift oscillator. The feedback connection 97 from capacitor 94 to the base of transistor 92 applies a regenerative signal to the input of the transistor, forcing it into oscillation as long as the bias potential at the base of the transistor is at a sufficient level to maintain the oscillation.

The measurement and switching circuit comprising transistor 99 provides the appropriate bias potential at a selected narrow range of resistances of the photoconductive element 17. The resistive parameter of the photoconductor 17 is sensed by transistor 100, basically an impedance converter, in the base circuit of which the photoconductor is connected. The transistor 100 is connected in series circuit with resistors 101 and 102 to form a voltage-dividing circuit. The junction between the emitter of transistor 100 and resistor 101 is connected to the base of oscillator transistor 92 through a resistor 103. The base of the oscillator transistor 92 is connected through switching transistor 99 to one side of the source of energization.

At light levels which are too low for proper exposure, the resistance of the photoconductor 17 is too high to support a current through resistors 101 and 102 sufficient to develop the bias potential necessary to trigger the oscillator into operation. As more light is permitted to fall on the photoconductor, the potential on the base of transistor 92 raises until a level is reached at which the oscillator is switched on. This represents the correct exposure level and the transducer winding 81 is energized by the resulting oscillations. As still more light is permitted to fall on the photoconductor, the current in voltage-dividing resistors 101 and 102 reaches a level at which transistor 99 is switched on, again lowering the potential on the base of transistor 92 and switching the oscillator off. This deenergizes the transducer and signals the fact that the operator has gone beyond the correct exposure factor setting.

It should be clear that the illustrative embodiment described in detail herein is intended to represent but one example of how the invention may be practiced. Thus, although the selection of the correct exposure factor has been shown in connection with a camera having a variable aperture and a fixed shutter speed, the invention could be practiced with equal advantages in a camera having a fixed aperture and a variable shutter speed or, alternatively, in one having a programmed combination of shutter speeds and apertures. As indicated before, in place of a transducer having a separately generated oscillation, there may be employed a transducer or buzzer having a self-induced vibration, the essential element being that it should signal to the operator the selection of the correct exposure factor without demanding his visual attention.

Since many other variations and modifications may be made in the above apparatus without departing from the scope of the invention herein involved, it is intended that all matter contained in the above description or shown in the accompanying drawings shall be interpreted as illustrative and not limiting on the scope of this invention in its broader aspects.

What is claimed is:

1. The combination with a camera having an exposure aperture for exposing a photosensitive surface to light passing through said aperture from a scene, comprising:

exposure control means including a manually adjustable instrumentality movable to a plurality of selectable settings for controlling the amount of light admitted through said aperture during exposure, each setting of said instrumentality determining a different one of a plurality of exposure factors, there being a correct exposure factor for each level of scene brightness; and photometer means including vibration-inducing means for inducing in said instrumentality a vibration perceptible to the tactile sense when the correct exposure factor is selected.

2. An optical imaging and exposure combination responsive to image light from at least a portion of a field of view toward which it is directed for producing selected image characteristics comprising:

control means including manually adjustable instrumentality for varying the image characteristics produced by said combination, each setting of said instrumentality determining a different one of said image characteristics, there being a correct setting of said instrumentality for each image situation;

vibration-inducing means for producing, when energized, a sensible vibration in said adjustable instrumentality;

photoresponsive means directed toward said field of view and having an electrical parameter which varies in accordance with a quality of the light incident thereon from said field of view; and selective energizing means responsive to said electrical parameter of said photoresponsive means and controlled by the setting of said instrumentality for energizing said vibration-inducing means when the selected setting of said instrumentality is correct.

3. An image camera having an exposure aperture for exposing a photosensitive surface to light passing through said aperture from a scene, comprising:

exposure control means including a manually adjustable instrumentality movable to a plurality of selectable settings for controlling the amount of light admitted through said aperture during exposure, each setting of said instrumentality determining a different one of a plurality of exposure factors, there being a correct exposure factor for each level of scene brightness; and means for signaling the selection of the correct exposure factor including transducer means for producing in a hand held portion of said image camera a vibration perceptible to the tactile sense when energized, photoresponsive means exposed to scene light and having an electrical parameter which varies in accordance with the intensity of light incident thereon, and energization means responsive to said electrical parameter of said photoresponsive means and controlled by the setting of said manually adjustable instrumentality for energizing said transducer when the selected setting of said instrumentality determines the correct exposure factor.

4. The combination of claim 3 wherein said transducer means is operatively associated with said instrumentality for inducing therein, when excited, a vibration perceptible to the tactile sense.

5. In a photographic camera having an exposure aperture and shutter means for opening and closing the aperture to expose a photosensitive material therein:

manually adjustable means movable to a plurality of selectable settings for controlling the amount of light admitted through said aperture during exposure;

transducer means operatively associated with said manually adjustable means for inducing a vibration therein when energized;

photoresponsive means exposed to scene light and having an electrical parameter which varies in accordance with the intensity of light incident thereon; and energization means responsive to said electrical parameter of said photoresponsive means and controlled by the setting of said manually adjustable means for energizing said transducer when the selected setting of said adjustable means determines a correct exposure factor.

6. A photographic camera having an exposure aperture and shutter means for opening and closing the aperture to expose photosensitive materials, and comprising:

manually adjustable means movable in a first mode to a plurality of selectable settings for controlling the amount of light admitted through said aperture during exposure and movable in a second mode for actuating said shutter means;

transducer means operatively associated with said manually adjustable means for inducing a vibration therein perceptible to the tactile sense when energized;

photoresponsive means exposed to scene light and having an electrical parameter which varies in accordance with the intensity of light incident thereon; and
energization means responsive to said electrical parameter of said photoresponsive means and controlled by the setting of said manually adjustable means for energizing said transducer when the selected setting of said adjustable means determines a correct exposure factor.

7. A photographic camera having an exposure aperture and shutter means for opening and closing the aperture to expose photosensitive materials comprising:
 a manually movable control instrumentality mounted for rotary and reciprocatory movement;
 adjustable diaphragm means responsive to rotary movements of said instrumentality for varying the area of said exposure aperture;
 photoresponsive means exposed to scene light and having an electrical parameter which varies in accordance with the intensity of light incident thereon;
 electrically operated photometer means including said photoresponsive means and means responsive to rotary movements of said control instrumentality for producing an output signal at a correct exposure setting of said adjustable diaphragm means;
 energization means including a source of electrical energy and switch means responsive to manipulation of said instrumentality for connecting said source to said photometer means;
 vibration-producing means operatively associated with said manually adjustable instrumentality and responsive to said output signal for inducing a vibration perceptible to the tactile sense in said instrumentality; and
 means responsive to reciprocatory movement of said instrumentality for actuating said shutter means.

8. A photometer comprising:
 means for deriving photometric factors including an adjustable instrumentality movable to a plurality of selectable settings, each indicative of respective levels of scene brightness;
 vibration-inducing means for producing in a hand held portion of said photometer a vibration perceptible to the tactile sense when energized;
 photoresponsive means having an electrical parameter which varies in accordance with scene brightness; and
 selective energization means responsive to said electrical parameter of said photoresponsive means and controlled by the setting of said adjustable instrumentality for energizing said vibration-inducing means when the selected setting of said instrumentality corresponds to the brightness of light from said scene.

9. The photometer of claim 8 wherein said instrumentality is manually adjustable and said vibration-inducing means causes the manually adjustable instrumentality to vibrate in a manner perceptible to the tactile sense.

References Cited by the Examiner

UNITED STATES PATENTS

| | | | |
|---|---|---|---|
| 2,149,250 | 3/1939 | Bing | 88—24 |
| 3,106,141 | 10/1963 | Estes | 88—23 X |
| 3,246,585 | 4/1966 | Scudder | 95—10 |

NORTON ANSHER, *Primary Examiner.*

J. F. PETERS, *Assistant Examiner.*